June 3, 1969

R. CAMPBELL 3,447,203

EXTRUSION APPARATUS

Filed July 5, 1967

INVENTOR.
RONALD CAMPBELL

United States Patent Office 3,447,203
Patented June 3, 1969

3,447,203
EXTRUSION APPARATUS
Ronald Campbell, Nazeing, England, assignor to Minister of Technology in Her Britannic Majesty's Government of the United Kingdom of Great Britain and Northern Ireland, Millbank, London, England
Filed July 5, 1967, Ser. No. 651,316
Claims priority, application Great Britain, July 6, 1966, 30,289/66
Int. Cl. B29f 3/04
U.S. Cl. 18—14                              2 Claims

ABSTRACT OF THE DISCLOSURE

A die for use in the manufacture of a perforated extrusion comprises a convergent die bush, having a pin carrier positioned at the entry end of the die, and on which is mounted an array of long flexible pins each anchored in the pin carrier and able, during an extrusion, to follow the plastic flow pattern in the extrusion.

---

The die is particularly useful in the manufacture of multi-tubular extrusions from materials having relatively high viscosity. Such materials include many solid propellants such as solventless cordite.

The invention relates to the production of multiperforated extrusions, and is particularly concerned with the extrusion of multiperforated relatively highly viscous solid materials such as solid extrudable propellant materials.

In the manufacture of tubular extrusions a mandrel is generally sited in the die and the material is forced between the mandrel and the surrounding die wall. If the extrusion were to be multi-tubular, a corresponding number of mandrels would be required, and if the density and size of the perforations in the extrusion demands it, the diameter of the mandrels would have to be quite small. These mandrels are normally essentially long pins held stiffly in position by a spider or other support in the die, their configurations being predetermined and preset with an empirical correction for inevitable and undesirable flexing. Dies containing more than seven such pins have been difficult and expensive to make. Although the extrusion of soft plastics materials, of plastics materials softened with solvents, or of thermoplastic materials which can be softened sufficiently by heating may often be carried out with these complicated dies, even having fine pins, attempts at extrusion of multi-tubular articles from relatively highly viscous materials, using dies having relatively inflexible pin mandrels, often result in the fracture or buckling of pins. Various plastics materials are required to be extruded which are highly viscous, which cannot be sufficiently softened by heating, and with which it is not always possible or desirable to use a solvent because of difficulty in subsequently removing the solvent and of consequent shrinkage. Such materials include many solid propellants, for example solventless cordite. Also envisaged are plastics which are cured or crosslinked after extrusion, and some pastes, clays, and ceramics.

An object of the invention is to provide a robust die for use in the manufacture of multiperforated extrusions which can have a large number of perforations, even when the material is of stiff composition having relative high viscosity.

According to the present invention, a die for use in the manufacture of a multi-tubular extrusion comprises a convergent die bush shaped to impart the required cross-sectional shape to the extrusion, a pin carrier positioned at the entry end of the die bush, and a plurality of flexible pins each anchored in the pin carrier against movement in the direction of flow of the extrusion, each flexible pin being long enough to reach a region where, during an extrusion process, external die pressure on the extrusion is relieved. The convergence of the die bush permits a stable plastic flow pattern to be set up throughout the whole cross-section of the die. Each pin must be sufficiently flexible to follow the streamlines of the plastic flow pattern. More than one pin carrier may be positioned at the entry end of the die bush if required in a given extrusion.

The pin carrier may have a plurality of holes therethrough in which the pins are accommodated, and each pin may have an enlarged end whereby it is anchored in the pin carrier against movement in the direction of flow of an extrusion but may readily withdrawn in the opposite direction from the carrier.

In one embodiment each pin has an enlarged end in the form of a nipple formed on or attached to the pin so that it can be anchored in a hole through the pin carrier which is slightly larger in diameter than the pin, but can be readily withdrawn when desired. The nipple may be attached to the pin by any conventional means such as screwing, soldering or brazing for example.

A plurality of pin carriers may be provided for alternative use with a die in order to cater for the large number of possible patterns of holes in an extrusion. At the same time, however, a pin carrier can be rendered comparatively versatile by being provided with a large number of anchoring holes.

The pin carrier may be a spider or set of spiders, a spider being a body comprising at least two faired spokes provided with the anchoring holes, positioned at the entrance to the die. According to a feature of the invention, however, the pin carrier is a streamer plate, provided with a large number of holes, at least 40, widely and preferably evenly distributed across the plate. Thus the pins can be placed in selected holes and a plurality of perforation patterns obtained in the extrusion.

These holes serve a dual purpose, a selected number of them being used as pin anchors in a given extrusion, but the remainder normally the majority, serving to apportion the flow of plastic material between the pins. A regular flow pattern is thereby set up in the plastic material flowing through the die bush, which guides the flexible pins, holding them steady in the streamlines. The relative radial positions of pins in the streamer plate will normally differ from those of the holes in the final extrusion because of a velocity gradient across the die. The actual difference between these positions will depend upon the apportioning of material between the pins by the vacant streamer holes. In order to ensure a flow of material around each pin and thus guide each pin into a required flow path, the preferred maximum number of perforations obtainable using a particular streamer plate occurs when alternate holes in the streamer plate are fitted with pins.

The holes in the pin carrier may advantageously be directed substantially along the expected streamlines of the material. Where the pin-carrier is a streamer plate, this can also have a domed or part spherical surface shape, whose radius is taken from an approximate focal point of convergence of the die. If these holes are counterbored to receive a shank on the nipples, the pins can be held in the die to lie for at least part of their length along the fluid lines of the material before commencement of extrusion. In cases where the holes are not flow directed, and even where they are, the nipples and pins can be of a size in relation to the anchoring holes such that the pins have a certain amount of free universal movement and alignment of the pins with the flow lines is facilitated.

Flexible pins which have been found to operate satisfactorily are made of cable composed of wire strands twisted together, such as Bowden cable. The free end of such cables should be tinned to prevent untwisting. Even so, cables of this type have high frictional drag compared with a single strand wire, and therefore there is a limitation on the viscosity of the material which can be extruded using them. Some improvement is possible by coating the pins with a friction reducing material, such as polytetrafluoroethylene. When relatively very high viscosity materials are to be extruded, or when the perforations required are too small to use twisted strand cables, a satisfactory pin material is high tensile steel wire. The Bowden cable is preferably splayed out behind the nipple and then soldered: the steel wire should, if size permits, be split and splayed out, for soldering or brazing to the nipple.

In order that the invention may be more clearly understood a flexible pin die will now be described, by way of example, with reference to the accompanying drawings, of which:

Figure 1:
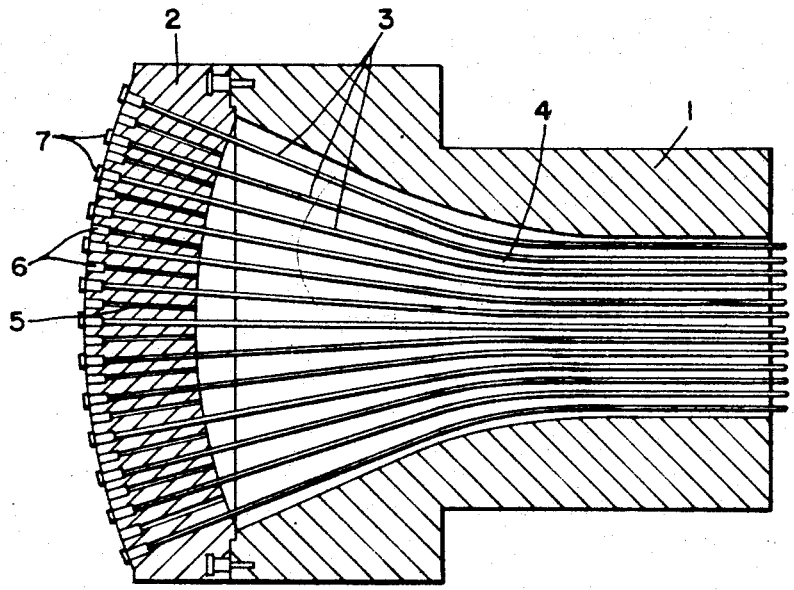
FIGURE 1 is a longitudinal section of a die having a domed streamer plate.
Figure 2:
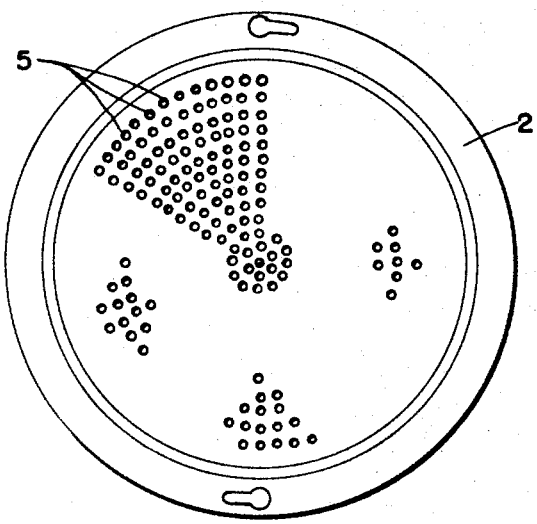
FIGURE 2 is a diagrammatic view of a streamer plate.

As shown in FIGURE 1 the die comprises a convergent die bush 1 for mounting onto an extruder, a pin carrier in the form of a streamer plate 2 and a plurality of flexible pins 3. The die bush 1 has a bore 4 which has a portion which tapers down from the entry end towards its exit orifice. The streamer plate 2 is fitted over the entry end of the die bush 1. The portion of the plate 2 carrying the pins 3 is domed, and perforated with a plurality of holes 5 each of which is directed towards a point towards which the tapered portion of the bore 4 converges. The holes 5 are countersunk at their entry ends with recesses 6. Each flexible pin 3 has a nipple 7 at one end, by which it can be anchored in a hole 5, the nipple nestling in the recess 6. The pins 3 are cut from Bowden cable, their lengths being such that they will, in operation, protrude a short distance from the exit orifice of the die bush 1. The free end of each pin 3 is tinned and the end to be anchored is splayed out behind the nipple 7 and soldered to it. The streamer plate 2 shown in FIGURE 2 has 469 holes. Two of the possible patterns of perforations obtainable with this plate use a number of pins calculated from the following formulae: $1+3n(n+1)$ and $3n^2$ where $n$ is an integer lower than eight in the first case and seven in the second.

The pattern of perforations need not always be symmetrical, of course, neither need the perforations be all of equal shape and size. The provision of a large number of holes in the streamer plate permits a wide variety of perforation patterns, furthermore the die may have a solid mandrel whereby a hollow tubular extrusion can be produced.

In one particular example of a die as described above, used for producing a 2.8 in. diameter propellant charge, the die bush 1 has an entry end of 6½ in. diameter and is 8½ in. long. The holes in the streamer plate 2 are 0.098 in. diameter. The pins 3 are made of 0.076 in. diameter Bowden cable and measure 10½ in. from the nipple 7 to the free end. Two of the possible patterns of perforations in the charge have 19 and 108 holes respectively. In the latter case the sum of the cross sectional areas of the unfilled holes is about 2.7 sq. in. and the cross sectional area of the exit orifice with the blockage caused by the 108 pins 3 subtracted, is about 5.8 sq. in.

The presence of the flexible pins helps to create sufficient back pressure in the die to consolidate the extrusion despite this area increase. In cases where the die has a comparatively large diameter or relatively few pins, this frictional back pressure may not be sufficient, and conventional consolidation methods, such as a long die parallel, or external mechanical pressure, may be employed.

I claim:

1. A die for use in the manufacture of multiperforated extrusions of highly viscous solid material consisting of
a convergent die bush having an enlarged entrance and a smaller exit with a bore section therebetween tapering down from said entrance to said exit so as to compress said viscous material passing through said die bush;
a pin carrier consisting of a plate having a plurality of countersunk perforations secured over said entrance of said die bush;
a plurality of elongated flexible pin members each of which having one enlarged end removably secured in said countersunk perforations of said plate, a body extending through said tapered bore section and a second free end extending outwardly from said exit of said die bush;
said flexible pin members being fewer in number than the total number of said perforations in said plate whereby,
said perforations apportion the flow of said viscous material between said flexible pin members.

2. The die of claim 1 wherein said pin members are secured in alternate holes of said perforations of said plate member.

References Cited

UNITED STATES PATENTS

| | | | |
|---|---|---|---|
| 791,111 | 5/1905 | Du Pont | 18—14 |
| 241,068 | 5/1881 | Reeve | 25—17 |
| 1,725,959 | 8/1929 | Heath | 25—17 |
| 1,738,665 | 12/1929 | Ober | 25—17 |
| 2,908,037 | 10/1959 | Harkenrider | 18—12 |
| 2,944,287 | 7/1960 | Moran | 264—3 |
| 2,965,925 | 12/1960 | Dietzsch | 18—12 |

FOREIGN PATENTS 336,748  1/1904  France.

WILLIAM J. STEPHENSON, *Primary Examiner.*

U.S. Cl. X.R.

18—12; 25—17